United States Patent
Wu et al.

(10) Patent No.: US 11,028,307 B2
(45) Date of Patent: Jun. 8, 2021

(54) MODIFIED CELLULOSE NANOCRYSTALS AND THEIR USE IN DRILLING FLUIDS

(71) Applicants: Qinglin Wu, Baton Rouge, LA (US); Meichun Li, Baton Rouge, LA (US)

(72) Inventors: Qinglin Wu, Baton Rouge, LA (US); Meichun Li, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 16/176,031

(22) Filed: Oct. 31, 2018

(65) Prior Publication Data
US 2019/0127625 A1 May 2, 2019

Related U.S. Application Data

(60) Provisional application No. 62/747,218, filed on Oct. 18, 2018, provisional application No. 62/579,687, filed on Oct. 31, 2017.

(51) Int. Cl.
*C09K 8/20* (2006.01)
*C09K 8/24* (2006.01)
*C09K 8/14* (2006.01)

(52) U.S. Cl.
CPC .............. *C09K 8/206* (2013.01); *C09K 8/145* (2013.01); *C09K 8/24* (2013.01); *C09K 2208/08* (2013.01); *C09K 2208/10* (2013.01)

(58) Field of Classification Search
None
See application file for complete search history.

(56) References Cited

U.S. PATENT DOCUMENTS

| | | | | |
|---|---|---|---|---|
| 2013/0274149 A1* | 10/2013 | Lafitte | .................... | C09K 8/905 507/112 |
| 2015/0072902 A1* | 3/2015 | Lafitte | .................... | C09K 8/035 507/112 |
| 2016/0168443 A1* | 6/2016 | Lafitte | ...................... | C09K 8/10 507/112 |
| 2017/0107434 A1* | 4/2017 | Moghadam | ........... | C08F 251/02 |
| 2018/0044569 A1* | 2/2018 | Yakovlev | ............... | C09K 8/035 |

OTHER PUBLICATIONS

M. Li et al. (2015), Cellulose nanoparticles as modifiers for rheology and fluid loss in bentonite water-based fluids, *ACS J. Applied Materials and Interface* 7(8), 5006-5016.
Y. Wen, "Stability enhancement of nanofibrillated cellulose in electrolytes through grafting of 2-acrylamido-2-methylpropane sulfonic acid," *Cellulose* vol. 24, pp. 731-738 (2017).
J. Zoppe et al., "Pickering emulsions stabilized by cellulose nanocrystals grafted with thermo-responsive polymer brushes," *J. Colloid and Interface Sci.*, vol. 369, pp. 202-209 (2012).
B. Xie et al., "Thermo-thickening behavior of LCST-based copolymer viscosifier for water-based drilling fluids," *J. Petr. Eng. Sci.*, vol. 154, pp. 244-251 (2017).
M. Li et al. (2018), pH-Responsive Water-Based Drilling Fluids Containing Betonite and Chitin Nanocrystals. ACS Sustainable Chemistry and Engineering, vol. 6 (3), pp. 3783-3795.
K. Song et al. (2016), Water-based bentonite drilling fluids modified by novel biopolymer for minimizing fluid loss and formation damage. Colloids and Surfaces A: Physicochemical and Engineering Aspects, vol. 507, pp. 58-66.
K. Song et al. (2016), Performance of low solid bentonite drilling fluids modified by cellulose nanoparticles. Journal of Natural Gas Science and Engineering, vol. 34, pp. 1403-1411.
M. Li et al, (2016), Cellulose Nanocrystals and Polyanionic Cellulos as Additives in Bentonite Water-Based Drilling Fluids: Rheological Modeling and Filtration Mechanisms. Industrial & Engineering Chemistry Research, vol. 55 (1), pp. 133-143.
M. Li, et al. (2015), Cellulose Nanoparticles: Structure-Morphology-Rheology Relationship, ACS Sustainable Chemistry and Engineering, vol. 3 (5), pp. 821-832.
M. Li, et al, (2015), Soy Protein Isolate As Fluid Loss Additive in Bentonite-Water Based Drilling Fluids. ACS Applied Materials and Interfaces, vol. 7 (44), pp. 24799-24809.

* cited by examiner

*Primary Examiner* — John J Figueroa
(74) *Attorney, Agent, or Firm* — John H. Runnels

(57) ABSTRACT

Bentonite (or other clay) water-based drilling fluids incorporating functionalized cellulose nanocrystals are disclosed. Cellulose nanocrystals are modified with tailored surface charges or tailored levels of salt-tolerant polymer grafting, and combined with bentonite (or other clay) nanoplatelets in an aqueous suspension. Thermal performance of drilling fluids can also be enhanced by surface grafting of thermally functional polymers onto cellulose nanocrystals.

9 Claims, No Drawings

MODIFIED CELLULOSE NANOCRYSTALS AND THEIR USE IN DRILLING FLUIDS

PRIORITY CLAIMS

This application claims the benefit under 35 U.S.C. § 119(e) of the Oct. 31, 2017 filing date of U.S. provisional patent application Ser. No. 62/579,687; and of the Oct. 18, 2018 filing date of U.S. provisional application Ser. No. 62/747,218. The complete disclosures of both priority applications are hereby incorporated by reference in their entirety.

GOVERNMENT SUPPORT

This development of this invention was funded by the United States Government under grant number E17-23 awarded by the United States Department of Agriculture, Forest Service. The Government has certain rights in this invention.

FIELD OF THE INVENTION

This invention pertains to modified cellulose nanocrystals and their use in drilling fluids.

BACKGROUND OF THE INVENTION

Drilling fluids play a critical role in oil and gas exploration. The functions of drilling fluids include: suspending and carrying drill cuttings from the well, cooling and lubricating the bit and drilling assembly, stabilizing the wellbore, and preventing formation collapse. There are three main types of drilling fluids: water-based drilling fluids (WDF), oil-based drilling fluids, and synthetic-based drilling fluids. Water-based drilling fluids generally comprise water, bentonite (BT), a rheological modifier, and a filtration control agent. Low-solid, bentonite water-based drilling fluids (BT-WDFs) have attracted recent attention due to advantages such as high permissible drilling rate, low friction, thin resulting filter cake, low pipe sticking, and good stability in shale. However, previous bentonite (water-based) drilling fluids also typically show poor suspending and carrying capacity for drill cuttings, they tend to be penetrated rapidly by water, and they tend to be sensitive to cationic contaminants (e.g., from NaCl or other salts). These drawbacks have limited the use of bentonite drilling fluids in oilfields. Prior efforts to overcome these drawbacks have focused on additives such as natural polymers, synthetic polymers, inorganic particles, and inorganic particle/polymer composites.

Bentonite clay comprises a large number of plate-shaped structures often called "platelets," having both (larger) face surfaces and (narrower) edge surfaces. The face surface bears a permanent negative charge arising from the substitution of lattice cations, whereas the charge on the edge surface is pH-switchable: It can be positively charged under acidic conditions, or negatively charged under alkaline conditions, via protonation or deprotonation of amphoteric Al—OH and Si—OH groups on the edges. Under neutral conditions, the edge surface could possibly bear a positive charge due to the exposed octahedral Al layers. Thus cations in sedimentary salt-gypsum beds can be attached to the negatively charged face surfaces of BT platelets through electrostatic attraction, causing a charge imbalance in the electrical double layer, leading to flocculation and aggregation structures. As a result, the density, rheology, and filtration of bentonite-based drilling fluids can change, which can lead to serious issues, including lost circulation, frictional losses, wellbore swelling, formation collapse, and pipe sticking. Furthermore, conditions within even a single formation can vary, often substantially. Going deeper into a wellbore, the pH, temperature, pressure, salinity, and mineral composition can change, which can cause substantial changes in the overall performance of drilling fluids. There is an unfilled need for improved drilling fluids with in-situ controllable rheology, superior thermal tolerance, and improved salt resistance.

Nanomaterials have the potential for use in low-solid, "smart" drilling fluids. They have the potential to modulate rheological and filtration performance over a wide range of operating environments. Biomass-derived cellulose nanoparticles (CNPs), primarily cellulose nanofibers (CNFs) and cellulose nanocrystals (CNCs) are emerging nanomaterials with promising characteristics that can include one or more of the following: sustainability, nanoscale dimension, high aspect ratio, large specific surface area, extraordinary mechanical performance, ease of functionalization, and shear thinning behavior. Cellulose nanocrystals are hydrophilic, highly crystalline, rod-shaped nanomaterials derived from sustainable resources (e.g., cotton and wood pulp) through acid hydrolysis or chemical oxidation. In the past few years, there has been a growing interest in cellulose nanoparticles as additives for low-solid, smart/nano drilling fluid formulations. For example in M. Li et al. (2015), Cellulose nanoparticles as modifiers for rheology and fluid loss in bentonite water-based fluids, *ACS J. Applied Materials and Interface* 7(8), 5006-5016, bentonite/cellulose nanoparticle/water-based drilling fluids were formulated and characterized for their rheological and filtration performance. We found that in comparison with bentonite/cellulose nanofiber-water-based drilling fluids, the bentonite/cellulose nanocrystal-water-based drilling fluids had superior rheological properties, higher temperature stability, less fluid loss volume, and thinner filter cakes. These properties make cellulose nanocrystals more appealing for use in drilling fluid application. Combining cellulose nanocrystals with a commercial filtration control agent based on polyanionic cellulose (PAC) improved the rheological and filtration performance of bentonite drilling fluids.

Nanoparticles including $SiO_2$, graphene, ZnO, CuO, have been used as modifiers to modify the rheology and filtration performance of drilling fluids.

Both cellulose nanocrystals and cellulose nanofibers remain stable after aging at 140° C. for at least 3 days. This thermal stability is superior to that of more conventional rheological modifiers for water-based drilling fluids, such as guar gum or xanthan.

It has been reported that the copolymers of acrylamide (AM) and 2-acrylamido-2-methyl propane sulfonic acid (AMPS) show tolerance to salt environments.

Y. Wen, "Stability enhancement of nanofibrillated cellulose in electrolytes through grafting of 2-acrylamido-2-methylpropane sulfonic acid," *Cellulose* vol. 24, pp. 731-738 (2017) describes the grafting of the salt resistant polymer Poly(Sodium 2-acrylamido-2-methylpropane-sulfonate) onto the surface of cellulose nanofibers; and the behavior of the resulting nanofibers under different NaCl concentrations.

J. Zoppe et al., "Pickering emulsions stabilized by cellulose nanocrystals grafted with thermo-responsive polymer brushes," *J. Colloid and Interface Sci.*, vol. 369, pp. 202-209 (2012) describes the grafting of thermo-responsive polymer poly(N-isopropylacrylamide) onto cellulose nanocrystals, and their use in forming stabilized Pickering emulsions.

B. Xie et al., "Thermo-thickening behavior of LCST-based copolymer viscosifier for water-based drilling fluids," *J. Petr. Eng. Sci.*, vol. 154, pp. 244-251 (2017) describes the synthesis of the thermo-responsive copolymer poly (Sodium 2-acrylamido-2-methylpropanesulfonate-co-divinyl benzene-co-vinylcaprolactam), and its use as a thermo-responsive additive in Bentonite-water-based drilling fluids.

There is an unfilled need for rheological and filtration additives in well fluids with improved salt resistance. About 30% of world oil and gas are produced from fields that are rich in rock salt and gypsum. These salt-gypsum beds were formed by sedimentation of salty water millions of year ago. The concentrations of salts (e.g., $Na^+$ and $Ca^{2+}$ salts) in salt-gypsum beds can be as high as 40 g/L. The cations are electrostatically attracted to the negatively-charged surface of bentonite platelets, producing a charge imbalance in the double layer, leading to flocculation and aggregation. Cation-induced dispersion of bentonite platelets in water-based drilling fluids, from exfoliation to flocculation and aggregation, gives rise to dramatic increases in the volume of fluid lost, and in the thickness of deposited filter cakes, which can in turn lead to formation collapse, wellbore swelling, and pipe sticking issues.

In deep wells, temperature instability can become significant. Wellbore temperature generally increases with depth; higher temperatures can significantly alter the performance of drilling fluids via mechanisms including bentonite hydration, bentonite flocculation and aggregation, and degradation of organic polymer additives. Conventional viscosifiers (e.g., xanthan gum, guar gum and carboxymethyl cellulose) do not maintain desired rheological properties at high temperatures, leading to deterioration in yield stress and wellbore cleaning efficiency. There is an unfilled need for improved viscosifiers with thermo-responsive performance (e.g., thermo-thickening) high-performance drilling fluids, to maintain or improve carrying capacity for drill cuttings at high temperatures.

SUMMARY OF THE INVENTION

We have discovered improved bentonite water-based drilling fluids incorporating functionalized cellulose nanocrystals. Cellulose nanocrystals are modified with tailored surface charges or tailored levels of salt-tolerant polymer grafting, and combined with bentonite nanoplatelets in an aqueous suspension. The novel composition provides drilling fluids with high shear thinning, reduced filtration loss, and high salt tolerance.

In one embodiment, carboxylated cellulose nanocrystals are surface-modified with salt-tolerant polymers by free radical polymerization. The modified cellulose nanocrystals are dispersed in an exfoliated bentonite clay suspension, and the modified cellulose nanocrystals attach to the clay platelets via van der Waals forces and electrostatic attraction on the sides and surfaces of the clay platelets. The salt resistance of the drilling fluid increases dramatically, imparting rigidity to the cellulose nanocrystal-bentonite networks, impeding invasion by salt ions, enhance water barrier capacity, and reducing filtration loss of the fluids. The novel formulations are suited for wide application in diverse oil and gas fields, especially in sedimentary salt-gypsum beds. The grafting ratio and concentration of functionalization on the cellulose nanocrystals can be tailored to tune the properties of the compositions.

As used in the specification and claims, "cellulose nanocrystals" or "cellulose particles" are cellulose particles 1 µm or less in length, and 100 nm or less in diameter. Preferably the length is between 200 nm and 500 nm. Preferably the diameter is between 5 and 20 nm. Whether the cellulose is or is not "crystalline" per se, as "crystals" are sometimes defined in other contexts, is not dispositive. Unless context clearly indicates otherwise, the term "cellulose nanocrystals" or "cellulose particles" should be understood to encompass both unmodified cellulose, and chemically modified cellulose—modified as, for example, described in the present specification. Cellulose nanocrystals are available commercially.

Uses for the new formulations include not only drilling fluids, but also other oilfield fluids, such as fracturing fluids, completion fluids, and injection fluids for enhanced oil recovery, where smart functionality and superior thermal performance and salt tolerance would be advantageous.

In another embodiment, we have also achieved improved thermo-responsive performance by surface grafting of thermally functional polymers onto cellulose nanocrystals. In prototype embodiments, the thermally functional polymers used were poly(2-acrylamido-2-methylpropane sulfonic acid) (PAMPS), and poly(N-isopropylacrylamide) (PNIPAM). The presence of sulfonic acid groups provides strong steric hindrance, which helps impart superior thermal resistance and salt tolerance. PNIPAM is a thermo-thickening polymer with a lower critical solution temperature (LCST) ranging from 30 to 35° C., depending on the detailed molecular structure. As the temperature rises to the lower critical solution temperature, the polymer undergoes an interesting phase transition from hydrophilic to hydrophobic due to temperature-driven chain dehydration. Grafting thermal functional polymers such as PAWS or PNIPAM onto the surface of cellulose nanocrystals helps impart thermo-responsive performance to the cellulose nanocrystals, as well as to drilling fluids based upon them, leading to superior carrying capacity for drill cuttings in a high temperature environment.

Although this invention is described herein primarily as being used with bentonite clay, it should also work with other types of clays, including kaolinite, illite, chlorite, vermiculite, and attapulgite clays.

MODES FOR PRACTICING THE INVENTION

Bentonite, a type of clay, comprises "platelets" with one dimension substantially smaller than the other two, and thus typically having two opposing "face" surfaces and a narrower, circumferential "edge" surface. The two types of surfaces possess different characteristics. The face surfaces bear a permanent negative charge from the substitution of lattice cations. The charge on the edge surfaces is pH-switchable. The edges can be positively charged under acidic conditions, and negatively charged under alkaline conditions, following protonation or deprotonation of amphoteric Al—OH and Si—OH groups on the edges. Under neutral conditions, the edge surfaces might bear a slight positive charge due to the exposed octahedral Al layers.

The surface characteristics of cellulose nanocrystals play a major role in interactions with the surfaces of bentonite platelets, and therefore also in the performance characteristics of bentonite/cellulose nanocrystal-water-based drilling fluids.

Several types of cellulose nanocrystals, each with distinctive surface features, were prepared to examine differences in surface interactions with bentonite and in the performance of drilling fluids. Among the types examined were carboxylated cellulose nanocrystals, non-carboxylated cellulose nanocrystals, and cationic cellulose nanocrystals. We also chemically functionalized cellulose nanocrystals with salt tolerant polymers through free radical polymerization. Remarkable improvements in the salt resistance of bentonite/cellulose nanocrystal-water-based drilling fluids resulted.

We observed that the drilling fluids incorporating carboxylated cellulose nanocrystals exhibited superior rheological and filtration performance over those made with non-carboxylated cellulose nanocrystals or cationic cellulose nanocrystals. We attributed the superior performance of the materials with carboxylated cellulose to a more uniform dispersion state of the bentonite platelets, arising from interactions between the carboxyl groups on the functionalized nanocrystals and the weakly positively-charged edge surfaces of the bentonite platelets. Further improvements in the salt resistance of the fluids was achieved by manipulating the grafting ratio and the concentration of the functionalized cellulose nanocrystals, producing $Ca^{2+}$ resistance superior to that of existing commercial fluid formulations. Enhanced salt resistance, far beyond that achieved with conventional materials, has been achieved by screening salt-susceptible sites of the bentonite platelets via extensive functionalization of cellulose nanocrystals, "wrapping," and the preservation of uniform dispersion states of bentonite-cellulose nanocrystal clusters.

By grafting two types of polymers onto the cellulose nanocrystals, we are better able to screen the salt-susceptible sites of the clay platelets. One type of polymer is positively charged at the pH of a drilling fluid (typically pH 7.5-10), and one type of polymer is negatively charged at the pH of the drilling fluid. The positively-charged polymer tends to associate with the negatively-charged surfaces of the clay particles, and the negatively-charged polymer tends to associate with the positively-charged surfaces of the clay particles. The charges on the clay surface are thus "screened," and the tendency of the clay particles to aggregate in the presence of salts is greatly reduced. Thus this embodiment of the modified nanocellulose imparts salt resistance to the drilling fluid, as it reduces aggregation of the clay particles and thus reduces the ability of salt water to penetrate. Examples of positively-charged (cationic) monomers that may be used in preparing the grafted cationic polymers of this invention include, for example: acrylamide, dimethyl diallyl ammonium chloride, (3-(methacryloylamino) propyl) trimethyl ammonium chloride, (2-(methacryloyloxy) ethyl) trimethyl ammonium chloride, vinylbenzyl trimethyl ammonium chloride, vinyl-3-ethylimidazolium bromide, N-vinylpyridine, and N-vinylpyrrolidone. Examples of negatively-charged (anionic) monomers that may be used in preparing the grafted anionic polymers of this invention include, for example: 2-Acrylamido-2-methyl-1-propanesulfonic acid (PAMPS), poly(sodium 4-styrenesulfonate, acrylic acid), N,N-dimethyl acrylamide, poly(acrylamide-co-2-acrylamido-2-methyl-1-propanesulfonic acid), poly(acrylamide-co-sodium 4-styrenesulfonate), poly(acrylamide-co-acrylic acid-co-2-acrylamido-2-methyl-1-propanesulfonic acid); poly(acrylamide-co-acrylic acid-co-sodium 4-styrenesulfonate); poly(acrylamide-co-N,N-dimethyl acrylamide-co-2-acrylamido-2-methyl-1-propanesulfonic acid); and poly(acrylamide-co-N,N-dimethyl acrylamide-co-sodium 4-styrenesulfonate). These polymers may optionally be copolymers, terpolymers, etc.

By manipulating the surface characteristics of cellulose nanocrystals, and the surface interactions between cellulose nanocrystal and bentonite platelets, the performance of bentonite/cellulose nanocrystal-water-based drilling fluids in oil and gas fields can be controlled.

Some Abbreviations Used water-based drilling fluid (WDF)
bentonite (BT)
biomass-derived cellulose nanocrystal(s) (CNC)
short, rod-shaped cellulose nanocrystal(s) (CNC)
long, spaghetti-like cellulose nanofiber(s) (CNF)
thermo-thickening CNC (tCNC)
salt-resistant CNC (sCNC)

Example 1. Materials

Carboxylated cellulose nanocrystals (BGB Ultra 8 wt % gel) were purchased from Blue Goose Biorefineries Inc. (Saskatoon, SK, Canada). According to the manufacturer's product information, the carboxylated cellulose nanocrystals were prepared by a transition metal catalyst oxidation of western hemlock pulp. Wyoming sodium bentonite (bentonite, Aquagel Gold Seal, dry-powdered, 200 Mesh) was supplied by Baroid Industrial Drilling Products Inc. (Houston, Tex., USA). Polyanionic cellulose (polyanionic cellulose-L) was provided by Halliburton Company (Houston, Tex., USA). Calcium chloride was purchased from J. T. Baker Chemical Company (Phillipsburg, N.J., USA). Sodium hydroxide pellets, sodium chloride, cationic surfactant 2,3-epoxypropyl trimethylammonium chloride (EPTMAC), acrylamide, 2-Acrylamido-2-methyl-1-propanesulfonic acid, and ammonium persulfate were obtained from Sigma-Aldrich Company (St. Louis, Mo., USA). All chemicals were used without further purification.

Examples 2-4. Preparation of Non-Carboxylated Cellulose Nanocrystals, of Cationic Cellulose Nanocrystals, and of poly(acrylamide-co-2-Acrylamido-2-methyl-1-propanesulfonic acid)-modified Carboxylated Cellulose Nanocrystals Through Free Radical Polymerization 50 g of 8 wt % carboxylated cellulose nanocrystal gel was diluted to a 200 g, 2 wt % suspension in deionized water with strong mechanical stirring for 1 h. Then 0.4 mol NaOH pellets were added to the 2 wt % carboxylated cellulose nanocrystal suspension, and the mixture was stirred at 250 rpm at 60° C. for 3 h. The highly carboxylated cellulose nanocrystals dissolved in the alkaline solution, leaving cellulose nanocrystals largely depleted of surface carboxyl groups. The resulting non-carboxylated cellulose nanocrystals aggregated strongly, and rapidly precipitated to the bottom of reaction flask. The resulting suspension was washed with deionized water, following by centrifugation at 10,000 rpm for several repetitions to reduce alkalinity. Finally, the purified non-carboxylated cellulose nanocrystal suspension was poured into a regenerated cellulose dialysis tube (Nominal MWCO 12,000-14,000, Fisher Scientific). The tube was dialyzed against excess deionized water in a large water tank for 5 days.

50 g of 8 wt % carboxylated cellulose nanocrystal gel was first activated in a concentrated NaOH solution at 65° C. for 30 min. Then 0.074 mol EPTMAC surfactant was slowly added to the activated carboxylated cellulose nanocrystal gel. The reaction was carried out in a 50 mL round-bottom flask with vigorous mechanical stirring at 65° C. for 6 h. Following the reaction, the mixture was diluted with excess deionized water, and then poured into a regenerated cellulose dialysis tube (Nominal MWCO 12,000-14,000, Fisher Scientific). The tube was placed in a large water tank for 1 week to remove unreacted monomers by dialysis.

100 g of 8 wt % carboxylated cellulose nanocrystal gel was diluted to a 400 g, 2 wt % suspension in deionized water in a 500 mL three-necked flask. The suspension was purged with $N_2$ for 30 min, and then the initiator ammonium persulfate (0.223 or 0.446 g) was added at room temperature, followed by continuous stirring for another 30 min. The temperature was then increased to 70° C., and a solution of acrylamide (0.08 or 0.16 mol) and 2-Acrylamido-2-methyl-1-propanesulfonic acid (AMPS, 0.08 or 0.16 mol) was added to the suspension. The acrylamide/AMPS/carboxylated cellulose nanocrystal ratio varied from 0.01 mol/0.01 mol/1 g to 0.02 mol/0.02 mol/1 g, and the ratio of initiator ammonium persulfate was fixed at 1 wt % of total monomer content. Graft polymerization was carried out under $N_2$ atmosphere at 70° C. for 3 h. The resulting mixture was centrifuged at 1000 rpm for 10 min, and then washed with deionized water. The centrifugation/washing cycle was repeated three times to remove residual homopolymer. The resulting suspension was poured into a regenerated cellulose dialysis tube (Nominal MWCO 12,000-14,000, Fisher Scientific), and dialyzed against excess deionized water for 1 week to remove unreacted monomer. After dialysis, the purified modified cellulose nanocrystal suspension was vigorously stirred and then weighed. A fraction of the modified cellulose nanocrystal suspension was then dried in an oven, and the solid content of modified cellulose nanocrystal suspension was calculated based on the change in the mass. The grafting ratio (G %) of modified cellulose nanocrystals was calculated as:

$$G\% = \frac{m_2 - m_1}{m_1} \times 100\%$$

Where $m_2$ is the mass of modified cellulose nanocrystals after polymerization and purification, and $m_1$ is the original mass of carboxylated cellulose nanocrystals used for polymerization (8 g). The grafting ratio of the modified cellulose nanocrystals increased from 16.06% to 43.91% as the acrylamide/AMPS/carboxylated cellulose nanocrystal ratio changed from 0.01 mol/0.01 mol/1 g to 0.02 mol/0.02 mol/1 g.

Example 5. Characterization of Prepared Cellulose Nanocrystals

A measured amount of cellulose nanocrystals (e.g., carboxylated cellulose nanocrystals, non-carboxylated cellulose nanocrystals, or cationic cellulose nanocrystals) or other modified cellulose nanocrystal suspension was dried in a vacuum oven at 70° C. for 3 days. The resulting solid films were characterized by Fourier Transform Infrared Spectroscopy (FTIR), solid-state $^{13}C$ nuclear magnetic resonance (NMR), and X-ray photoelectron spectroscopy (XPS). FTIR spectra were collected using a Bruker FTIR analyzer (Tensor-27, Bruker Optics Inc., Billerica, Mass.) in transmittance mode, equipped with a Zn/Se attenuated total reflectance crystal accessory. The spectrum was taken from 600 to 4000 $cm^{-1}$ with a resolution of 4.0 $cm^{-1}$. Solid-state $^{13}C$ NMR experiments were carried out with a Bruker Avance 400 WB instrument. All spectra were recorded at room temperature, with a 4 mm probe operating at a magnetic field of 9.39 T. The magic angle spinning (MAS) rate was 12 Hz, with a cross-polarization (CP) contact time of 2 ms, and a relaxation delay time of 2 s. The Hartman-Hahn matching protocol was based on glycine. Chemical shift values were referenced to adamantine, with the low-field signal set to 38.48 ppm. XPS measurements were performed on a Specs PHOIBOS-100 spectrometer (SPECS, Berlin, Germany), operating at 10 kV at a current of 10 mA. Survey spectra were recorded from 1200 to 0 eV at 40 eV pass energy and a 1.0 eV scan step. High-resolution N is spectra were acquired at 40 eV pass energy and a 0.1 eV scan step. Elemental composition was determined using SpecLab software. The dispersion states and morphology of cellulose nanocrystals or modified cellulose nanocrystals were characterized by TEM (JEM 1400, JEOL), operated at an accelerating voltage of 120 kV. A droplet of diluted suspension (0.02 wt %) was deposited on a glow-discharge treated copper grid. The samples were then stained with 2 wt % uranyl acetate solution for 3 min. The zeta potential of the cellulose nanocrystal or modified cellulose nanocrystal suspension was measured with a ZetaTrac analyzer (MicroTrac Inc., Largo, Fla., U.S.A.). Before each measurement, the cellulose nanocrystal or modified cellulose nanocrystal suspension was diluted to 0.1 wt % with deionized water, and its pH value was determined around 7-8. Reported values were mean values, based on five replicates.

Examples 6-9. Properties of Prepared Cellulose Nanocrystal Materials

Different preparation approaches produced cellulose nanocrystals with different surface functional groups. E.g., hydrolysis with sulfuric acid introduced sulfate groups on the surfaces of the cellulose nanocrystals; while oxidation with 2,2,6,6-tetramethyl-1-piperidinyloxy radical (TEMPO) generated carboxyl groups. In one series of embodiments, we used commercially-available, surface-carboxylated cellulose nanocrystals with a carboxyl content of 0.18 mmol/g as the starting material.

TEM observations showed that the individual carboxylated cellulose nanocrystals were generally rod-shaped, ~100-150 nm long, and ~9-14 nm wide. When the surface characteristics of carboxylated cellulose nanocrystals were modified, the crystal properties changed. For example, the absence of negatively charged carboxylate groups on the surface weakened electrostatic repulsion between neighboring crystals, and thus led to nanocrystal aggregation. By contrast, higher surface charges on the cationic cellulose nanocrystals led to greater separation and more uniform dispersal of the crystals (no aggregation). However, the dimensions of the individual nanocrystals were nearly unchanged after modification.

FTIR spectra confirmed the successful surface modifications. The carboxylated cellulose nanocrystals exhibited absorption peaks at 1741, 1644 and 1606 $cm^{-1}$, assigned to the carbonyl group (C=O) in carboxylic acid (—COOH), to absorbed moisture, and to the carbonyl group (C=O) in sodium carboxylate (—COONa), respectively. The peak at 1606 $cm^{-1}$ was more intense than that at 1741 $cm^{-1}$, indicating that the —COONa group predominated. After alkaline treatment, the peaks at 1741 and 1606 $cm^{-1}$ disappeared, consistent with absence of carboxyl groups. In addition to the original FTIR peaks of carboxylated cellulose nanocrystals, the cationic cellulose nanocrystals showed new absorption peaks at 1480 and 1450 $cm^{-1}$, corresponding to the $CH_2$ and $CH_3$ bends of EPTMAC substituents. Solid-state $^{13}C$ NMR and XPS analyses were also performed. The carboxylated cellulose nanocrystals showed characteristic resonance signals of cellulose type I at 105.2 (C1), 88.9 (crystalline C4), 84.3 (amorphous C4), 74.8, 72.7 (C2, C3 and C5), and 65.3 (C6) ppm. A small resonance signal corresponding to carbonyl (C=O) appeared at 174 ppm, consistent with the presence of carboxyl groups on the surface of carboxylated cellulose nanocrystals. After alkaline treatment, the resonance peak at 174 ppm was absent, consistent with FTIR results. In the cationic cellulose nanocrystals, a new resonance signal at 55.2 ppm was observed, assigned to the methyl carbons in the EPTMAC substituents.

XPS provided additional information on the changes produced by the surface modifications. The appearance of a nitrogen 1 s peak around 400 eV, and an observed increase in elemental carbon from 66.81% to 70.21% following cationization strongly confirmed the successful grafting of EPTMAC substituents in the cationic cellulose nanocrystals. Based on elemental nitrogen measurements, the EPTMAC content was found to be 0.43 mmol/g, about 2.4-fold the carboxyl content in carboxylated cellulose nanocrystals. We concluded that we had successfully prepared three types of cellulose nanocrystals: carboxylated cellulose nanocrystals with 0.18 mmol/g carboxyl, non-carboxylated cellulose nanocrystals with 0.02 mmol/g carboxyl, and cationic cellulose nanocrystals with 0.43 mmol/g cationic EPTMAC.

We grafted polyacrylamide (PAM) and poly (2-acrylamido-2-methyl-1-propanesulfonic acid) (PAMPS) onto the surface of carboxylated cellulose nanocrystals by free radical polymerization, using ammonium persulfate as initiator. By altering the monomer content (e.g., acrylamide/AMPS/carboxylated cellulose nanocrystal=0.01 mol/0.01 mol/1.0 g; or 0.02 mol/0.02 mol/1.0 g), we made two types of modified carboxylated cellulose nanocrystals with grafting ratios of 16.06% ("L-modified" cellulose nanocrystals) and 43.91% ("H-modified" cellulose nanocrystals), respectively. The successful functionalization of carboxylated cellulose nanocrystals was confirmed by FTIR and solid-state $^{13}C$ NMR spectra. The FTIR spectra of modified and unmodified cellulose nanocrystals showed characteristic absorption peaks for PAM and PAMPS after surface functionalization. For example, absorption peaks at 1657, 1547 and 1452 $cm^{-1}$ were attributed to the C=O, N—H and C—N stretching vibrations of the amide group in both PAM and PAMPS. The absorption peaks at 1184 and 1031 $cm^{-1}$ were assigned to the asymmetric and symmetric bands of the $SO_2$ group in PAMPS. Solid-state $^{13}C$ NMR spectra of carboxylated cellulose nanocrystals and modified cellulose nanocrystals showed a strong signal at 174 ppm, attributed to the C=O group (C8 and C11) in both PAM and PAMPS. Signals at 62 and 53 ppm were assigned to the side group —$CH_2$— (C14) and quaternary carbon (C12) in PAWS. Signals at 42 and 38 ppm were attributed to the backbone —CH— (C7 and C10) and —$CH_2$— (C10 and C15) in both PAM and PAMPS. A signal at 28 ppm was attributed to the side chain —$CH_3$ in PAMPS. The strongly anionic polymer PAMPS on the surface of modified cellulose nanocrystals caused the zeta potentials of the L-modified cellulose and H-modified cellulose nanocrystals to increase to −64.02 and −67.73 mV, respectively. The surface charges also led to dispersion (rather than aggregation) of modified cellulose nanocrystals in aqueous solution, as observed by TEM.

Example 10. Preparing Bentonite-Cellulose Nanocrystal Suspensions

To explore surface interactions between cellulose nanocrystal and bentonite, cellulose nanocrystal-bentonite suspensions were prepared and characterized by measuring zeta potential, by precipitation experiments, and by TEM observations. The concentration of bentonite in the suspensions was held constant at 0.1 wt %; and different concentrations of cellulose nanocrystals were used: 0, 0.01, 0.05 and 0.1 wt %. The zeta potential was measured with a ZetaTrac analyzer (MicroTrac Inc., Largo, Fla., U.S.A.). Five replicates were conducted, and average values are reported. The precipitation experiments were conducted in a 20 mL vial for 24 h. During the experiments, nanoparticles gradually deposited on the bottom of vial, and digital photos were taken at different times: t=0, 5 min, 1 h, 6 h, 12 h and 24 h. TEM observations were performed with a Transmission Electron Microscope (JEM 1400, JEOL) at an accelerating voltage of 120 kV. The bentonite-cellulose nanocrystal suspension was diluted 5 times with deionized water, and then deposited into a glow-discharge treated carbon grid. To improve electron microscopy contrast, the samples were stained with 2 wt % uranyl acetate solution for 3 min.

Example 11-13. Surface Interactions Between Cellulose Nanocrystals and Bentonite in Aqueous Suspension We examined surface interactions between bentonite and cellulose nanocrystals by measuring zeta potentials of suspensions at different cellulose nanocrystal concentrations. A suspension of bentonite alone had a zeta potential of −31.71 mV; that of carboxylated cellulose nanocrystals alone (0.1 wt %) was −50.83 mV; that of non-carboxylated cellulose nanocrystals alone (0.1 wt %) was −17.68 mV; and that of cationic cellulose nanocrystals alone (0.1 wt %) was +34.1 mV. Because the edge surfaces only occupy a small fraction of the total surface area of bentonite platelets (<1%), the measured negative zeta potential value of bentonite alone (−31.71 mV) was inferred to result primarily from the negatively charged face surfaces of the bentonite platelets, and to be largely independent of the charge density on the edge surfaces. The shift in the zeta potential values from −50.83 mV (carboxylated cellulose nanocrystals) to −17.68 mV (non-carboxylated cellulose nanocrystals) to +34.1 mV (cationic cellulose nanocrystals) confirmed that the intended surface modifications had successfully occurred.

In the bentonite/cellulose nanocrystal suspensions, distinctive trends in the zeta potentials occurred as a function of the cellulose nanocrystal concentration, depending on the surface charges of the particular cellulose nanocrystals. For the bentonite/carboxylated cellulose nanocrystal suspension, the zeta potential decreased slightly as the concentration of carboxylated cellulose nanocrystals increased. By contrast, for the non-carboxylated and cationic cellulose nanocrystals, increasing concentrations of the cellulose nanocrystals led to a gradual increase in the zeta potential of the bentonite suspension. The zeta potential of the bentonite/cationic cellulose nanocrystal suspensions increased sharply as the cellulose nanocrystal concentration increased from 0.01 to 0.1 wt %, became almost neutral at 0.05 wt %, and was positive at 0.1 wt %.

The stability of bentonite/cellulose nanocrystal suspensions at different cellulose nanocrystal concentrations was investigated through static precipitation experiments. In a neat bentonite suspension, most of the bentonite platelets remained suspended in water over one hour, without precipitation. In a neutral environment, the negative charge on the face surfaces of the bentonite platelets gave rise to repulsive forces between platelets. The bentonite platelets could therefore remain exfoliated, with high colloidal stability in water. Adding carboxylated cellulose nanocrystals further improved the colloidal stability of the bentonite suspension. At 0.1 wt % carboxylated cellulose nanocrystals, the bentonite/carboxylated cellulose nanocrystals remained suspended in water for 12 h. By contrast, added non-carboxylated cellulose nanocrystals had an insignificant influence on the colloidal stability of bentonite. Precipitation of a bentonite/non-carboxylated cellulose nanocrystal suspension appeared to occur in two steps: first, the non-carboxylated cellulose nanocrystals precipitated over about one hour; and then the bentonite platelets sedimented more slowly, over several hours. By contrast, added cationic cellulose nanocrystals led to rapid sedimentation of the bentonite suspension, leaving a clear supernatant. The cationic cellulose nanocrystals were presumably closely bound to the bentonite platelets, and deposited simultaneously with them. The effect was more pronounced at higher concentrations of cationic cellulose nanocrystals.

These observations led us to three hypotheses concerning surface interactions between bentonite and cellulose nanocrystals: (1) Anionic carboxylated cellulose nanocrystals attach to the possibly positively charged edge surfaces of bentonite platelets via electrostatic attractions. This interaction leads to slight neutralization or compensation of carboxylated cellulose nanocrystals, resulting in the observed reduction in the zeta potential. Additionally, the carboxylated cellulose nanocrystals adsorbed on the edge surfaces of the bentonite platelets screened the possibly positively charged sites of bentonite platelets. This screening inhibits bentonite platelets from forming flocculated structures via "face-to-edge" electrostatic attractions, leading to a more uniform dispersion state and improved suspension stability. (2) The non-carboxylated cellulose nanocrystals with low levels of carboxyl groups (0.02 mmol/g) and poor dispersion were unable to bind efficiently to the bentonite platelets. The absence of strong interactions resulted in rapid separation of non-carboxylated cellulose nanocrystals from bentonite platelets, and a two-step precipitation. (3) The cationic cellulose nanocrystals strongly bound to the negatively-charged face surfaces of bentonite platelets via electrostatic attractions. This binding produced charge overcompensation of bentonite, resulting in a poor dispersion state and a destabilized suspension, as evidenced by the dramatic shift in the zeta from negative to positive, as well as rapid sedimentation. These assumptions were confirmed by TEM observations.

Examples 14-16. Preparation of Water-Based Drilling Fluids with Bentonite/Cellulose Nanocrystals, or with Bentonite/Modified Cellulose Nanocrystals In a typical preparation of drilling fluids, a cellulose nanocrystal or modified cellulose nanocrystal suspension was first diluted to 0.5 wt % using tap water with vigorous mechanical stirring for 1 h, and then 3 wt % bentonite was slowly added. The mixture was then stirred mechanically for 1 h at high speed to fully disperse the bentonite.

To study the influence of salt contaminants on the performance of drilling fluids, 4 wt % NaCl or 4 wt % $CaCl_2$) was also added to the water-based drilling fluids, followed by high-speed mechanical stirring for another 1 h.

To study the effect of modified cellulose nanocrystals on the salt resistance of bentonite drilling fluids, the concentrations of modified cellulose nanocrystals and of salts in bentonite/modified cellulose nanocrystal-water-based drilling fluids were varied from 0.5 to 2 wt %, and from 4 to 8 wt %, respectively.

The formulated drilling fluids were designated as bentonite-x/cellulose nanocrystal-y/Na-z, bentonite-x/cellulose nanocrystal-y/Ca-z, bentonite-x/modified cellulose nanocrystal-y/Na-z, or bentonite-x/modified cellulose nanocrystal-y/Ca-z; where x, y and z represent the weight percent of bentonite, cellulose nanocrystal (or modified cellulose nanocrystal), and $Na^+$ (or $Ca^{2+}$) in the drilling fluids, respectively. For purposes of comparison we also formulated water-based drilling fluids with: neat bentonite-3, bentonite-3/Na-4, bentonite-3/Ca-4, bentonite-3/polyanionic cellulose-0.5/Na-4, and bentonite-3/polyanionic cellulose-0.5/Ca-4.

Examples 17-19. Characterization of Water-Based Drilling Fluids with Bentonite/Cellulose Nanocrystals or with Bentonite/Modified Cellulose Nanocrystals We studied the rheology, filtration, and salt resistance of the drilling fluids. Rheological properties were examined with a stress-controlled rheometer (AR 2000, TA Instrument, New Castle, Del., USA) with a DIN concentric cylinder. For each measurement, approximately 20 mL of fluid was injected into a stainless steel cup. Steady-state shear viscosity and shear stress were measured as a function of shear rate over the range 0.1-1200 $s^{-1}$ at a fixed temperature of 25° C. Steady-state shear viscosity was also measured as a function of temperature over the range 25-100° C. at a fixed shear rate of 10 $s^{-1}$. Filtration performance was evaluated at room temperature at 100 psi according to API guidelines (API recommended Practice 13B-1, 2003). Approximately 200 mL of drilling fluid was added to the chamber of a standard API filter press (Model No. 30201, Fann Instrument Co., Houston, Tex.) with a filter paper (Part No. 206051, Fann Instrument Co., Houston, Tex.). The volume of fluid loss in mL was recorded after 1.0, 7.5, 15, 20, 25, and 30 min. The experiment ended after 30 minutes, the apparatus was vented, and the filter cake deposited on the filter paper was carefully removed. The appearance of the fresh filter cake was recorded with a digital camera, and its thickness ($T_c$) was measured. The filtration rate (q) of the filter cake was measured. Briefly, after the API filtration measurement, the remaining drilling fluid was removed from the chamber, and then approximately 100 mL tap water was added to the chamber with the filter cake at a pressure of 100 psi. The volume of water percolating through the filter was recorded at 180 s interval. The volume of water leaking from filter cake was plotted as a function of time, and fitted to a linear curve. The slope of the line was the filtration rate, q. The permeability ($K_c$) of the filter cake was calculated from Darcy's Law:

$$K_c = \frac{\mu T_c q}{\Delta P A} \qquad (2)$$

where µ is the viscosity of the filtrate at 25° C. (cP); $T_c$ is the thickness of the filter cake (cm); $\Delta P$ is the pressure difference (atm); A is the cross-sectional area ($cm^2$); and q is the filtration rate ($cm^3/s$). Salt resistance was assessed by comparing the rheological and filtration performance of the drilling fluids in the absence of salts, and with 4 wt % NaCl or 4 wt % $CaCl_2$.

Examples 20-22. Rheology and Filtration of Bentonite/Cellulose Nanocrystal-Water-Based Drilling Fluids Drilling fluids are usually designed as shear-thinning, non-Newtonian fluids, with high viscosity at low shear rates to suspend/transport drill cuttings to the surface, and low viscosity at high shear rates to be rapidly pumped into the wellbore. The incorporation of cellulose nanocrystals in bentonite drilling fluids not only enhanced shear thinning behavior, but also increased viscosity in the shear rate regime. Particularly, viscosity in the low shear rate regime (e.g., 0.1 s$^{-1}$) improved by at least three orders of magnitude, showing enhanced carrying capacity for drill cuttings. Another benefit was the enhanced thermal resistance of the drilling fluids, as seen from their relatively stable temperature-viscosity curves. By contrast, the viscosity of neat bentonite drilling fluids decreased from $3.58 \times 10^{-3}$ to $2.59 \times 10^{-3}$ Pa·s as the temperature rose from 25 to 100° C.

Carboxylated cellulose nanocrystals appeared to be better rheological modifiers in bentonite drilling fluids than their non-carboxylated or cationic counterparts: (1) the bentonite/carboxylated cellulose nanocrystal-water-based drilling fluids had a more progressive, smooth shear-thinning curve; while the other forms exhibited sudden plateaus at shears from 1 to 10 s$^{-1}$, ascribed to the formation of aggregations under oriented shear forces. The progressive shear properties of the carboxylated cellulose nanocrystal/bentonite drilling fluids allows for more predictable flow behavior, and therefore for enhanced efficiency and safety in drilling operations. (2) In comparison with the other two forms, the bentonite/carboxylated cellulose nanocrystal-water-based drilling fluids had higher viscosity at low shear rates, but lower viscosity at high shear rates, demonstrating superior drill cutting carrying capacity and superior pumpability. The rheological behaviors of bentonite and bentonite/cellulose nanocrystal-water-based drilling fluids were well described using the Herschel-Bulkley model, and the derived rheological parameters (e.g., yield stress $-\tau_0$) also supported the superior drill cutting carrying capacity of the bentonite/carboxylated cellulose nanocrystal-water-based drilling fluids.

The carboxylated cellulose nanocrystals were also more effective filtration control agents. Neat bentonite drilling fluids had API fluid loss volume of 31.2 mL. When 0.5 wt % carboxylated cellulose nanocrystals, non-carboxylated cellulose nanocrystals, or cationic cellulose nanocrystals were incorporated, the API fluid loss volume changed to 25.7, 33.2, and 61.3 mL, respectively. Notable improvement occurred only with the carboxylated cellulose nanocrystals. Moreover, after the API filtration measurement, the bentonite/carboxylated cellulose nanocrystal-water-based drilling fluids deposited a better quality filter cake, with lower thickness ($T_c$), slower filtration rate (q), and lower permeability ($K_c$), as compared with the other two forms. The superior filtration performance (e.g., lower API fluid loss volume) and better quality filter cake (e.g., thinner and lower permeability) are advantageous for maintaining wellbore stability, minimizing formation damage, and preventing pipe sticking.

The differences in the rheological and filtration characteristics of the bentonite/cellulose nanocrystal-water-based drilling fluids were ascribed to different dispersion states of the bentonite platelets (e.g., exfoliation, flocculation, or aggregation). The different dispersion states resulted from surface interactions between bentonite platelets and cellulose nanocrystals that depended on the surface charge of the nanocrystals. For bentonite/carboxylated cellulose nanocrystal-water-based drilling fluids, the binding of carboxylated cellulose nanocrystals to the edge surfaces of the bentonite platelets is hypothesized to shield the possibly positive sites of bentonite platelets, and thus to prevent bentonite platelets from aggregating through "face-to-edge" associations. As a result, bentonite platelets were homogenously dispersed with superior colloid stability in bentonite/carboxylated cellulose nanocrystal-water-based drilling fluids. In rheological measurements under continuous shear forces, because of the uniform dispersion state and superior colloid stability, the interactions in the bentonite/carboxylated cellulose nanocrystal/$H_2O$ system gradually disassociated, producing the observed progressive shear-thinning rheological curve. In the API filtration measurement, the uniformly dispersed bentonite platelets with superior colloid stability not only effectively blocked the pathways for water penetration, leading to a notable reduction in API fluid loss; but also minimized the amount of bentonite platelets deposited, producing a thin, low-permeability filter cake. By contrast, for the bentonite/non-carboxylated cellulose nanocrystal-water-based drilling fluids, removing carboxyl groups from the surface of the cellulose nanocrystals led to weaker surface interactions between bentonite and the cellulose nanocrystals. Consequently, the dispersion state of the bentonite platelets was nearly unchanged by adding non-carboxylated cellulose nanocrystals, resulting in similar API fluid loss volume. The observed non-progressive rheological curves as well as a thick, highly-permeable filter cake were attributed primarily to non-carboxylated cellulose nanocrystal aggregations. However, in the case of bentonite/cationic cellulose nanocrystal-water-based drilling fluids, the formation of bentonite tactoids as well as the adsorption of cationic cellulose nanocrystals on the face surfaces of bentonite created strong aggregations. In rheological measurement under continuous shear forces, the strong attractions within the aggregations were difficult to disassociate, generating the observed non-progressive rheological curve with a plateau from 1 to 10 s$^{-1}$. When the bentonite platelets were highly aggregated, their capacity as a water barrier greatly diminished, causing a dramatic increase in the API fluid loss volume, as well as depositing a filter cake with high thickness and high permeability.

Examples 23-26. Salt Resistance of the Various Drilling Fluids

A serious issue for practical application of WDFs in oil fields is salt contamination. There are many possible sources of salt contamination, including seawater, cement, limestone, and gypsum; salt contamination is often unavoidable. For example, the amount of $Ca^{2+}$ in some gypsum formations can reach up to ~40 g/L (i.e., ~4 wt %), leading to substantial changes in the density, rheology, and filtration performance of WDFs. Salts can especially alter the viscosity of drilling fluids. For example, we found that at the low shear rate of 0.1 s$^{-1}$, the presence of 4 wt % $Na^+$ or $Ca^{2+}$ led to a 1300 or 560-fold increase in the viscosity of BT-3 drilling fluids, respectively. Filtration properties were also highly susceptible to salt. For example, API fluid loss of a BT-3 drilling fluid with fresh water was 31.2 mL, which dramatically increased to 74.1 and 116.4 mL in the presence of 4 wt % $Na^+$ and $Ca^{2+}$, respectively. Incorporating 0.5 wt % cellulose nanocrystals enhanced the salt resistance of the BT-3 drilling fluids. For example, at a low shear rate of 0.1 s$^{-1}$, the presence of 4 wt % $Na^+$ and $Ca^{2+}$ slightly increased the viscosity of CNC-0.5/BT-3 drilling fluids, by 1.82 and 1.56-fold, respectively. However, the filtration performance of CNC-0.5/bentonite drilling fluids was still significantly affected by salt. The API fluid loss of CNC-0.5/BT-3 with fresh water was 25.7 mL, which dramatically increased to 73.8 and 86.2 mL in the presence of 4 wt % of $Na^+$ and $Ca^{2+}$, respectively. Furthermore, under the same saltwater conditions, CNC-0.5/BT-3 produced poor quality filter cakes with higher thickness ($T_c$), filtration rate (q), and permeability (K) in comparison with those of BT-3 drilling fluids. Such poor filtration performance and filter cake quality can lead to wellbore instability, formation collapse and pipe sticking. There is an unfilled need for improved salt resistance and filtration performance in drilling fluids.

The bentonite/carboxylated cellulose nanocrystal-water-based drilling fluids had the best rheological and filtration performance among the three drilling fluids tested. To examine salt resistance, bentonite-3/carboxylated cellulose nanocrystal-0.5/Na-4 and bentonite-3/carboxylated cellulose nanocrystal-0.5/Ca-4-water-based drilling fluids were formulated by adding 4 wt % NaCl or 4 wt % $CaCl_2$) to a bentonite-3/carboxylated cellulose nanocrystal-0.5-water-based drilling fluid. For comparison, bentonite-3/Na-4 and bentonite-3/Ca-4-water-based drilling fluids were also tested. Salt resistance was studied by observing rheological and filtration performance. The rheological properties of bentonite drilling fluids depended strongly on salt concentration. At a shear rate of $0.1\ s^{-1}$, the viscosity of bentonite drilling fluids increased by 1300 or 560 times by adding 4 $Na^+$ or $Ca^{2+}$, respectively. The carboxylated cellulose nanocrystal bentonite drilling fluids showed the highest salt resistance. For example, at a shear rate of $0.1\ s^{-1}$, the viscosities of bentonite/carboxylated cellulose nanocrystal, bentonite/carboxylated cellulose nanocrystal/Na, and bentonite/carboxylated cellulose nanocrystal/Ca-water-based drilling fluids were 5.39, 9.81 and 8.43 Pa·S, respectively. A 1.82 or 1.56-fold increase in the viscosity of bentonite drilling fluids was observed by adding 4 wt % $Na^+$ or 4 wt % $Ca^{2+}$, respectively. The filtration properties of both bentonite-based and bentonite/carboxylated cellulose nanocrystal-water-based drilling fluids were strongly affected by salt concentration. For example, the API fluid loss volume of bentonite-based and bentonite/carboxylated cellulose nanocrystal-water-based drilling fluids with fresh water were 31.2 and 25.7 mL, respectively; which dramatically increased to 74.1 and 73.8 mL, respectively, with 4 wt % $Na^+$, and further increased to 116.4 and 86.2 mL, respectively, with 4 wt % $Ca^{2+}$. While carboxylated cellulose nanocrystals improved the salt resistance of bentonite drilling fluids, the effect of carboxylated cellulose nanocrystals on API fluid loss volume was less marked. With either $Na^+$ or $Ca^{2+}$, bentonite/carboxylated cellulose nanocrystal-water-based drilling fluids deposited poorer-quality filter cakes, with higher $T_c$, q, and $K_c$ values, as compared to bentonite drilling fluids.

To enhance salt resistance, CNCs were modified via surface grafting with two functional polymers, viz., polyacrylamide (PAM) and poly(2-acrylamido-2-methylpropane sulfonic acid) (PAMPS) using ammonium persulfate (APS) as initiator. By altering the feed monomer proportions (i.e., AM/AMPS/CNC=0.01 mol/0.01 mol/1 g and 0.02 mol/0.02 mol/1 g), two salt-resistant CNCs (sCNCs) with grafting ratios of 16.1% (sCNCa) and 43.9% (sCNCb), respectively, were obtained. The successful functionalization of the cCNCs was confirmed through FTIR and solid-state $^{13}C$ NMR analyses. The calculated molar ratio of PAM/PAMPS in the synthesized sCNCa and sCNCb were 1.2/1 and 1.1/1, respectively. The higher PAM content in both sCNCa and sCNCb was ascribed to the higher reactivity of AM as compared to AMPS. Additionally, because of the negatively charged polymer PAMPS, the zeta potential values of sCNCa and sCNCb decreased to −58.1±2.7 and −62.8±2.3 mV, respectively. These charges led to higher dispersion of sCNCs in aqueous solution, confirmed by TEM micrographs.

To evaluate the effect of surface functionalization on salt resistance, fluid filtration performance was examined under different salt concentrations. The API fluid loss values of CNC-0.5/BT-3 with fresh water, 4 wt % NaCl, and 4 wt % $CaCl_2$) were 25.7, 73.8, and 86.2 mL, respectively. These fluid loss values declined to 16.9, 48.9, and 60.1 mL, respectively, when 16.06% PAM-co-PAMPS were grafted on the surface of the CNCs. When the grafting ratio increased from 16.06 to 43.91%, the API fluid loss values further declined to 13.63, 24.7, and 35.7 mL. Filtration performance is directly related to the quality of deposited filter cake. The surface functionalization led to a notable improvement in the quality of deposited filter cakes under all conditions tested. The thickness ($T_c$), filtration rate (q), and permeability (K) of filter cake deposited from sCNCb-0.5/BT-3 with 4 wt % $CaCl_2$) in water were 0.27 cm, 9.62 $cm^3/s$, and $8.34×10^{-3}$ mD, respectively; which decreased by 56.5, 57.1, and 81.3% as compared to the corresponding values for CNC-0.5/BT-3 drilling fluids under the same conditions. These results demonstrated that these surface modifications enhanced the salt resistance of CNC/BT-WDFs, leading to superior filtration performance under both freshwater and saltwater conditions.

To further demonstrate the effectiveness of sCNCb in improving the salt resistance of BT-WDFs, we studied the influence of the concentration of sCNCb and salts on the filtration performance of sCNC/BT-WDFs. As the concentration of sCNCb increased from 0.5 to 1 and 2 wt %, the API fluid loss values of sCNC/BT-3 drilling fluids at 4 wt % NaCl and $CaCl_2$) decreased from 24.7/35.7 to 15.5/19.9 to 15.1/17.5 mL, respectively. On the other hand, when the concentration of salts doubled from 4 to 8 wt %, only small changes were seen in the API fluid loss values of sCNCb-2/BT-3 drilling fluids. Poly(anionic cellulose) (PAC), a water-soluble anionic cellulose ether, has been commonly used as a filtration control agent in commercial drilling fluids due to its excellent thermal stability, superior salt resistance and strong antimicrobial activity. We compared the filtration performance of bentonite-based drilling fluids with sCNCb to those of bentonite-based drilling fluids with PAC under the same saltwater conditions. As compared to drilling fluids with PAC, the drilling fluids with sCNCb exhibited much better tolerance to divalent cations ($Ca^{2+}$), but poorer monovalent cation ($Na^+$) tolerance. These results showed that sCNCb is particularly useful as a salt tolerant agent for calcium-rich formations.

The salt-susceptible filtration performance of unmodified bentonite drilling fluids was ascribed to a change in the dispersion state of BT platelets in the presence of salt ions, from exfoliation to flocculation or aggregation. Bentonite platelets bear permanent negative charges on the face surfaces, and pH-responsive charges on the edge surfaces. In fresh water, the bentonite suspension had a zeta potential of −31.71 mV, attributed primarily to negatively charged face surfaces. In general, a stable colloid has a threshold value of ±30 mV, beyond which uniform dispersion tends to occur due to strong electrostatic repulsion. The BT platelets appeared to be homogeneously dispersed in WDFs, and to be exfoliated under freshwater conditions. Monovalent cations (e.g., $Na^+$) tended to adsorb onto and compensate the negative charges on the face surfaces of BT platelets, leading to the formation of flocculated microstructures through "face-to-edge" associations. The valence of the cation was significant. When divalent cations (e.g., $Ca^{2+}$) were added, the platelet-like morphology of BT effectively disappeared, and strong aggregations were observed. We hypothesize that the divalent cations crosslinked BT platelets through "face-to-face" associations. Flocculation or aggregation enhanced the rheology, but deteriorated the barrier capacity of BT platelets, resulting in dramatic increase in API fluid loss volume as well as poor filter cake quality.

When negatively-charged cellulose nanocrystals were incorporated into drilling fluids, the cellulose nanocrystals evidently attached to the positively-charged edge surfaces of bentonite, leading to improved rheological properties. However, because the salt-susceptible sites (i.e., the negatively-charged face surfaces) of the platelets were then still exposed, also adding $Na^+$ or $Ca^{2+}$ created flocculated or aggregated microstructures, respectively. Thus the negatively-charged cellulose nanocrystals showed highly salt-susceptible filtration performance.

Following surface functionalization with PAM or PAMPS, in addition to carboxylic groups the cellulose nanocrystals also had reactive amide and sulfonate groups on their surfaces, allowing the nanocrystals to attach to both edge and face surfaces of BT platelets through electrostatic attraction and hydrogen bonding. Particularly, the nanocrystals were attracted to the face surface of BT platelets via hydrogen bonding between the amide groups of the PAM grafts and the hydroxyl groups on the BT platelet surfaces. On the other hand, via the negatively charged PAMPS grafts, the nanocrystals also anchored to the positively-charged edge surfaces of BT platelets by electrostatic attraction. These associations extensively wrapped BT platelets, and thus effectively shielded the salt-susceptible sites. Subsequently, when either $Na^+$ and $Ca^{2+}$ cations were incorporated, the cations electrostatically attracted the negatively-charged PAMPS grafts on the surfaces of the nanocrystals, effectively preventing the bentonite platelets from flocculating or aggregating. These hypotheses were supported by TEM studies. The well-dispersed state of the BT platelets under both freshwater and saltwater conditions is hypothesized to be responsible for the observed superior filtration performance and salt resistance of the sCNC/BT-WDFs.

Examples 30-31. Thermo-Responsive Cellulose Nanocrystals and their Drilling Fluids In deep wells, temperature instability can become significant. Wellbore temperature generally increases with depth; higher temperatures can significantly alter the performance of drilling fluids via mechanisms including bentonite hydration, bentonite flocculation and aggregation, and degradation of organic polymer additives. Conventional viscosifiers (e.g., xanthan gum, guar gum and carboxymethyl cellulose) do not maintain desired rheological properties at high temperatures, leading to deterioration in yield stress and wellbore cleaning efficiency. There is an unfilled need for improved viscosifiers with thermo-responsive performance (e.g., thermo-thickening) high-performance drilling fluids, to maintain or improve carrying capacity for drill cuttings at high temperatures.

We achieved improved thermo-responsive performance by surface grafting of thermally functional polymers onto cellulose nanocrystals. In prototype embodiments, the thermally functional polymers used were poly(2-acrylamido-2-methylpropane sulfonic acid) (PAMPS), and poly(N-isopropylacrylamide) (PNIPAM). Ammonium persulfate (APS) was used as an initiator. PAMPS is a hydrophilic, reactive, anionic polymer with sulfonic acid groups ($—SO_3H$) on the backbone. The presence of sulfonic acid groups provides strong steric hindrance, which helps impart superior thermal resistance and salt tolerance. PNIPAM is a thermo-thickening polymer with a lower critical solution temperature (LCST) ranging from 30 to 35° C., depending on the detailed molecular structure. As the temperature rises to the lower critical solution temperature, the polymer undergoes an interesting phase transition from hydrophilic to hydrophobic due to temperature-driven chain dehydration. Grafting thermal functional polymers such as PAMPS or PNIPAM onto the surface of cellulose nanocrystals helps impart thermo-responsive performance to the cellulose nanocrystals, as well as to drilling fluids based upon them, leading to superior carrying capacity for drill cuttings in a high temperature environment.

We have synthesized prototype thermo-responsive CNCs (tCNCs) with different PNIPAM and PAMPS compositions by varying the feed molar ratio of NIPAM/AMPS from 1/0 to 7/1, 3/1, 1/1, and 0/1. Interestingly, the grafting ratio gradually decreased as more AMPS were added; and achieved the lowest value of 36.1% when NIPAM was totally absent. This observation was attributed to the lower reactivity of AMPS as compared to NIPAM. Successful grafting copolymerization was confirmed by FTIR and solid-state $^{13}C$ NMR analyses. New peaks at 1380 and 1184 $cm^{-1}$ in the FTIR spectra were assigned to C—H bonds in the methyl group ($—CH_3$) of isopropyl, and to $SO_2$ bands in the sulfonic acid groups ($—SO_3H$), which are characteristic of PNIPAM and PAMPS, respectively. New signals appearing at 53, 28 and 22 ppm in the $^{13}C$ NMR spectra were attributed to the quaternary carbon (C14) of PAMPS, the side methyl group ($—CH_3$) (C15) of PAMPS, and the side methyl group ($—CH_3$) (C10) of PNIPAM, respectively. The molar ratio of PNIPAM/PAMPS in the synthesized thermo-responsive cellulose nanocrystals can be estimated from the relation:

$$\frac{Mol_{PNIPAM}}{Mol_{PAMPS}} \times \frac{I_{10}}{2 \times I_{14}}$$

where $I_{10}$ and $I_{14}$ are the integral of the side methyl group ($—CH_3$) peak from PNIPAM at 22 ppm, and the integral of the quaternary carbon (C14) peak from PAMPS at 53 ppm, respectively. The measured actual molar ratios were generally higher than the feeding molar ratios because of the higher reactivity of NIPAM. The presence of abundant negatively-charged sulfate groups caused strong electrostatic repulsion between the ionized chain radical and the charged AMPS monomer, making the AMPS monomers more difficult to link during copolymerization than NIPAM monomers.

Grafting copolymerization notably modified the morphology and dispersion of CNCs, in a manner depending on the molar ratio of PNIPAM/PAMPS. In molecules with a high PNIPAM fraction, the grafted polymers assumed a generally spherical shape on the surface of the cellulose nanocrystals, with the diameters of the "grafting polymer" spheres ranging from 5 to 10 nm. The modified cellulose nanocrystals with high PNIPAM content aggregated tightly, creating dense clusters having poor dispersion. As the PAMPS content of the grafts increased, both the number and the size of the nanospheres on the nanocrystal surfaces decreased. In addition, some tiny, partially individualized needles with improved dispersion state were observed for some formulations with higher PAMPS content. These observations suggested that PNIPAM and PAMPS have opposite effects on the dispersion state of the modified nanocrystals. The grafting of uncharged PNIPAM on the surface of cellulose nanocrystals not only screened electrostatic repulsion between nanocrystals, but also led to hydrogen bonding between the amide group of PNIPAM grafts and the hydroxyl groups of cellulose, leading to poor dispersion. By contrast, grafting highly charged PAMPS onto the cellulose backbone gave rise to stronger electrostatic repulsion forces among cellulose nanocrystals, facilitating dispersion. Zeta potential measurements supported this inference: The zeta potential increased from −34.5±0.6 mV for unmodified cellulose nanocrystals to −8.4±0.8 mV for tCNCa. The presence of PAMPS in tCNCs reversely the zeta potential trend to −57.9±0.7 mV for tCNCe.

Nomenclature: "CNC" refers to unmodified cellulose nanocrystals; "tCNC" refers to thermoresponsive modified cellulose nanocrystals; "tCNCa" refers to tCNC with PNIPAP/AMPS=1/0; "tCNCb" refers to tCNC with PNIPAP/AMPS=7/1; "tCNCc" refers to tCNC with PNIPAP/AMPS=3/1; "tCNCd" refers to tCNC with PNIPAP/AMPS=1/1; and "tCNCe" refers to tCNC with PNIPAP/AMPS=0/1.

To investigate the temperature responsiveness of the ostensibly thermoresponsive cellulose nanocrystals, suspensions were photographed following heating and cooling. At room temperature, the thermoresponsive cellulose nanocrystals appeared more turbid than the unmodified cellulose nanocrystals, especially for tCNCa, which had the highest grafting ratio and poorest dispersion. Upon heating, the modified CNCs did not show any significant change in appearance. By contrast, the tCNCa rapidly turned milky, presumably from a phase transition of the PNIPAM grafts from a hydrophilic state to a hydrophobic one. Above the LCST, hydrophobic attraction among PNIPAM grafts predominated, leading to strong aggregation and strong light scattering. However, grafting PAMPS onto the CNCs hindered the phase transition. Among the tCNCs containing PAMPS grafts, only the tCNCb suspension (with a high ratio of NIPAM to AMPS) showed a slight change in appearance upon heating. The transitions in both tCNCa and tCNCb appeared to be reversible; i.e., they readily returned to the original state upon cooling back to room temperature. Comparable results were seen in steady-state viscosity measurements as a function of temperature. Only the tCNCa and tCNCb suspensions displayed notable thermo-thickening behavior over the range 25 to 80° C.; the tCNCa showed a steady increase in viscosity over the range about 30° C. to about 60° C., and then leveled out from 60° C. to 80° C.; and the tCNCa showed a steady but smaller increase in viscosity over the range about 30° C. to about 40° C., and then leveled out from 40° C. to 80° C. The observed LCST at 30.3° C. was very close to that of the free PNIPAM (~30.5° C.). Furthermore, the tCNCa suspension had a higher viscosity at 25° C. than that of the unmodified CNC suspension; while tCNCb, tCNCc, tCNCd, and tCNCe all had lower viscosities, consistent with the opposing roles of PNIPAM and PAMPS on the microstructure of tCNCs.

We tested the effects of both tCNCa and tCNCb on the thermal properties of bentonite-based drilling fluids. The tCNCa led to significant aggregation and rapid sedimentation, attributed to adsorption of PNIPAM grafts onto the bentonite surfaces via hydrogen bonding between hydroxyl groups of bentonite and amide groups of the NIPAM grafts. The aggregation and sedimentation reduced the water barrier capacity of bentonite platelets, leading to significant water leakage into the formation as well as to the deposition of very thick, impermeable filter cakes, which are detrimental to the stability of a wellbore. Thus we found that tCNCa is not a preferred additive for drilling fluids. By contrast, tCNCb drilling fluids had a highly uniform dispersion; the negatively-charged PAMPS on the surfaces of the tCNCs evidently inhibited aggregation and sedimentation. To study the temperature responsiveness of drilling fluids containing tCNCb, we conducted steady-state shear flow measurements at four temperatures (25, 40, 60 and 80° C.). Both the viscosity and the shear stress gradually increased with increasing temperatures, especially between 40 and 60° C. The relationship between shear stress ($\tau$) and shear rate ($\dot{\gamma}$) can be described using the Herschel-Bulkley model, which has the form:

$$\tau = \tau_y + k\dot{\gamma}^n$$

where $\tau_y$, k, and n are the yield stress, flow consistency coefficient and flow behavior index, respectively. At 25° C., $\tau_y$ was 0.10 Pa. As the temperature rose to 40, 60 and 80° C., the $\tau_y$ values increased, respectively, to 0.24, 0.56 and 0.73 Pa, indicating that the carrying capacity for drill cuttings increased with increasing temperature. To assess the LCST of tCNCb drilling fluids, temperature sweep measurements were taken at a fixed shear rate of 1 $s^{-1}$. In agreement with the steady-state shear flow measurements, we observed thermal thickening. The LCST for tCNCb drilling fluids was around 41.5° C., or 11.2° C. higher than that of the neat tCNCb suspension. These results suggested that incorporating bentonite inhibited the thermo-thickening behavior of the tCNCb suspension through strong surface interactions via PAMPS bridging. This hypothesis was supported by increasing the concentration of tCNCb from 1 to 1.5 wt %. When the tCNC concentration increased by 0.5 wt %, there was a 2° C. decrease in the LCST, and a 2.52-fold increase in viscosity at 80° C., attributed to stronger hydrophobic interactions. Furthermore, we found that the thermo-thickening behavior of tCNCb drilling fluids was well-maintained even after 10 heating/cooling cycles. We also observed that after each heating/cooling cycle, the system did not fully return to the initial state, and a higher viscosity was observed. The thermo-induced tCNCb-bentonite networks evidently did not fully re-disperse on cooling. Additionally, the LCST value gradually declined with further heating and cooling cycles. The largest reduction in LCST, 4.3° C., occurred after the first heating and cooling cycle. The LCST and rheological characteristics can be controlled, to meet the requirements of different reservoir environments, by adjusting the weight ratio of tCNCb to bentonite, as well as by controlling the allowed number of heating and cooling cycles.

The thermo-thickening behavior of tCNCb drilling fluids was further confirmed by TEM observations. Highly diluted tCNCb—bentonite drilling fluids were first dropped onto two carbon-coated TEM grids. One grid was then dried at 25° C. overnight to evaporate water; the other one was immediately transferred to an oven and dried at 50° C. for 1 h. In the sample dried at 25° C., the bentonite platelets were fully separated and uniformly dispersed, showing an exfoliated structure. In magnified TEM micrographs, tCNCs were seen attached on both the face and edge surfaces of the bentonite platelets. The attachment of tCNCb on the face surface of BT platelets evidently resulted from hydrogen bonding between amide groups of PNIPAM grafts and hydroxyl groups of BT platelets; whereas the attachment of tCNCa on the edge surface of BT might be due to electrostatic attractions between the negatively-charged surfaces of PAMPS grafts and the positively-charged edge surfaces of BT platelets. Furthermore, with the attachment of tCNCb, the negatively-charged PAMPS grafts on the surface of bentonite platelets enhanced the electrostatic repulsion between platelets, leading to the observed exfoliated structures; whereas aggregation and sedimentation was observed from tCNCa fluids with no PAMPS. For the sample dried at 50° C. (which is above the LCST), bentonite platelets evidently agglomerated through "face-to-face" or "edge-to-edge" associations. Above the LCST, there was also evidently a phase transition in the PNIPAM grafts on the nanocrystal surfaces, leading to the aggregation of tCNCb. This aggregation led to thermo-thickening of tCNCb-containing drilling fluids, as observed from rheology measurements.

Miscellaneous.

The complete disclosures of all references cited in this specification are hereby incorporated by reference in their entirety, as are the complete disclosures of the two priority applications: U.S. provisional application Ser. No. 62/579,687, and Ser. No. 62/747,218; particularly including (but not limited to) the figures and drawings in those provisional applications; as well as the complete disclosures of all references cited in the priority applications. In the event of an otherwise irresolvable conflict, however, the disclosure of the present specification shall control.

What is claimed:

1. A drilling fluid comprising an aqueous suspension of clay particles, sodium hydroxide for pH control, lignite as a deflocculant, polyanionic cellulose as a solid control agent, a finely-ground calcium montmorillonite clay/silica mixture as a viscosifier, and a composition comprising 0.01% to 5% of said drilling fluid by mass; wherein:
   (a) said composition comprises nanocellulose covalently bonded to first and second polymers;
   (b) said nanocellulose comprises cellulose particles 1 μm or less in length, and 100 nm or less in diameter;
   (c) said first polymer is negatively charged at pH 7.5-10; and
   (d) said second polymer is positively charged at pH 7.5-10.

2. The drilling fluid of claim 1, wherein at pH 7.5-10:
   (a) the clay particles have both positively-charged surfaces and negatively-charged surfaces:
   (b) said first polymer will tend to associate with the positively-charged surfaces of the clay particles;
   (c) said second polymer will tend to associate with the negatively-charged surfaces of the clay particles; and
   (d) the clay particles in suspension with said composition will aggregate with one another less than identical clay particles would otherwise aggregate with one another under otherwise identical conditions in an otherwise identical aqueous suspension, except that the otherwise identical suspension lacks said composition.

3. The drilling fluid of claim 1, wherein said cellulose particles are selected from the group consisting of unmodified nanocellulose, carboxylated nanocellulose, and cationic nanocellulose.

4. The drilling fluid of claim 1, wherein said cellulose particles comprise carboxylated cellulose nanocrystals.

5. The drilling fluid of claim 1, wherein:
   said first polymer is selected from the group consisting of 2-Acrylamido-2-methyl-1-propanesulfonic acid, poly (sodium 4-styrenesulfonate, acrylic acid), N,N-dimethyl acrylamide, poly(acrylamide-co-2-acrylamido-2-methyl-1-propanesulfonic acid), poly(acrylamide-co-sodium 4-styrenesulfonate), poly(acrylamide-co-acrylic acid-co-2-acrylamido-2-methyl-1-propanesulfonic acid); poly(acrylamide-co-acrylic acid-co-sodium 4-styrenesulfonate); poly(acrylamide-co-N,N-dimethyl acrylamide-co-2-acrylamido-2-methyl-1-propanesulfonic acid); and poly(acrylamide-co-N,N-dimethyl acrylamide-co-sodium 4-styrenesulfonate); and
   said second polymer is selected from the group consisting of acrylamide, dimethyl diallyl ammonium chloride, (3-(methacryloylamino) propyl) trimethyl ammonium chloride, (2-(methacryloyloxy) ethyl) trimethyl ammonium chloride, vinylbenzyl trimethyl ammonium chloride, vinyl-3-ethylimidazolium bromide, N-vinylpyridine, and N-vinylpyrrolidone.

6. The drilling fluid of claim 5; wherein the ratio of said first polymer to said cellulose is between 10% and 80% by mass; and wherein the ratio of said second polymer to said cellulose is between 10% and 80% by mass.

7. The drilling fluid of claim 1, wherein said composition is evenly distributed throughout said drilling fluid; wherein said cellulose particles associate with both the negatively-charged surfaces of the clay particles, and with the positively-charged surfaces of said clay particles via one or more of the following mechanisms: van der Waals forces, hydrogen bonding, and electrostatic attraction; and wherein at least one of the following properties of the drilling fluid is improved in a subterranean formation or a porous soil bed, as compared to the properties of an otherwise identical drilling fluid under otherwise identical conditions, except that the otherwise identical drilling fluid lacks said composition: salt resistance, viscosity, yield stress, stability, and fluid loss.

8. The drilling fluid of claim 1, wherein said clay particles comprise one or more clays selected from the group consisting of kaolinite, illite, chlorite, vermiculite, smectite, sodium bentonite, calcium bentonite, and attapulgite.

9. The drilling fluid of claim 1, wherein said clay particles comprise sodium bentonite.

* * * * *